United States Patent
Oviedo-Reyes

[19]

[11] Patent Number: 5,931,145
[45] Date of Patent: *Aug. 3, 1999

[54] SEPARATING STOCK HYDRAULIC SPEARGUN

[76] Inventor: Alfonso Oviedo-Reyes, 8370 W. Feaglee St. #110, Miami, Fla. 33144

[*] Notice: This patent is subject to a terminal disclaimer.

[21] Appl. No.: 08/764,759

[22] Filed: Dec. 12, 1996

[51] Int. Cl.⁶ .................................................. F41B 7/04
[52] U.S. Cl. ........................................... 124/20.3; 124/22
[58] Field of Search .............................. 124/21, 22, 20.3, 124/25, 35.1, 37, 88, 86, 23.1

[56] References Cited

U.S. PATENT DOCUMENTS

| | | | |
|---|---|---|---|
| 2,818,849 | 1/1958 | Woods | 124/22 |
| 2,896,604 | 7/1959 | Rebikoff | 124/22 |
| 3,006,330 | 10/1961 | Bach | 124/22 |
| 3,340,642 | 9/1967 | Vasiljevic | 124/22 X |
| 3,561,419 | 2/1971 | Cucuzza, Sr. | 124/25 |
| 3,585,979 | 6/1971 | Hendricks | 124/22 |
| 3,741,190 | 6/1973 | Lopez | 124/22 |
| 4,041,927 | 8/1977 | Van House | 124/61 |
| 4,169,456 | 10/1979 | Van House | 124/61 |
| 4,193,386 | 3/1980 | Rossi | 124/22 |
| 4,318,389 | 3/1982 | Kiss, Jr. | 124/22 |
| 4,732,134 | 3/1988 | Waiser | 124/41.1 X |
| 5,220,906 | 6/1993 | Choma | 124/25 |
| 5,222,473 | 6/1993 | Lint | 124/86 |
| 5,445,139 | 8/1995 | Bybee | 124/25 X |

*Primary Examiner*—John A. Ricci
*Attorney, Agent, or Firm*—Frank L. Kubler

[57] ABSTRACT

A speargun apparatus includes a rearward stock portion including a spear engaging structure; a forward stock portion including a speargun body and sling mount and a spear propulsion sling; and a hydraulic drive mechanism interconnecting the rearward stock portion and the forward stock portion for separating the rearward stock portion and the forward stock portion to increase tension in the sling. The forward stock portion preferably includes a longitudinal passageway and the rearward stock portion preferably includes a forwardly protruding guide rod slidably fitting into the longitudinal passageway for strengthening and stabilizing the apparatus when the forward stock portion and the rearward stock portion are separated. The rearward stock portion preferably includes the hydraulic drive mechanism base containing a fluid accumulation reservoir, a plunger slidably extensible from the base under pressure of hydraulic fluid within the reservoir, and a fluid pump for delivering fluid into the reservoir under pressure greater than atmospheric pressure. The rearward stock portion preferably contains a cavity and the base is retained within the cavity, and the plunger has a plunger forward end and the plunger forward end is preferably secured to the forward stock portion.

12 Claims, 3 Drawing Sheets

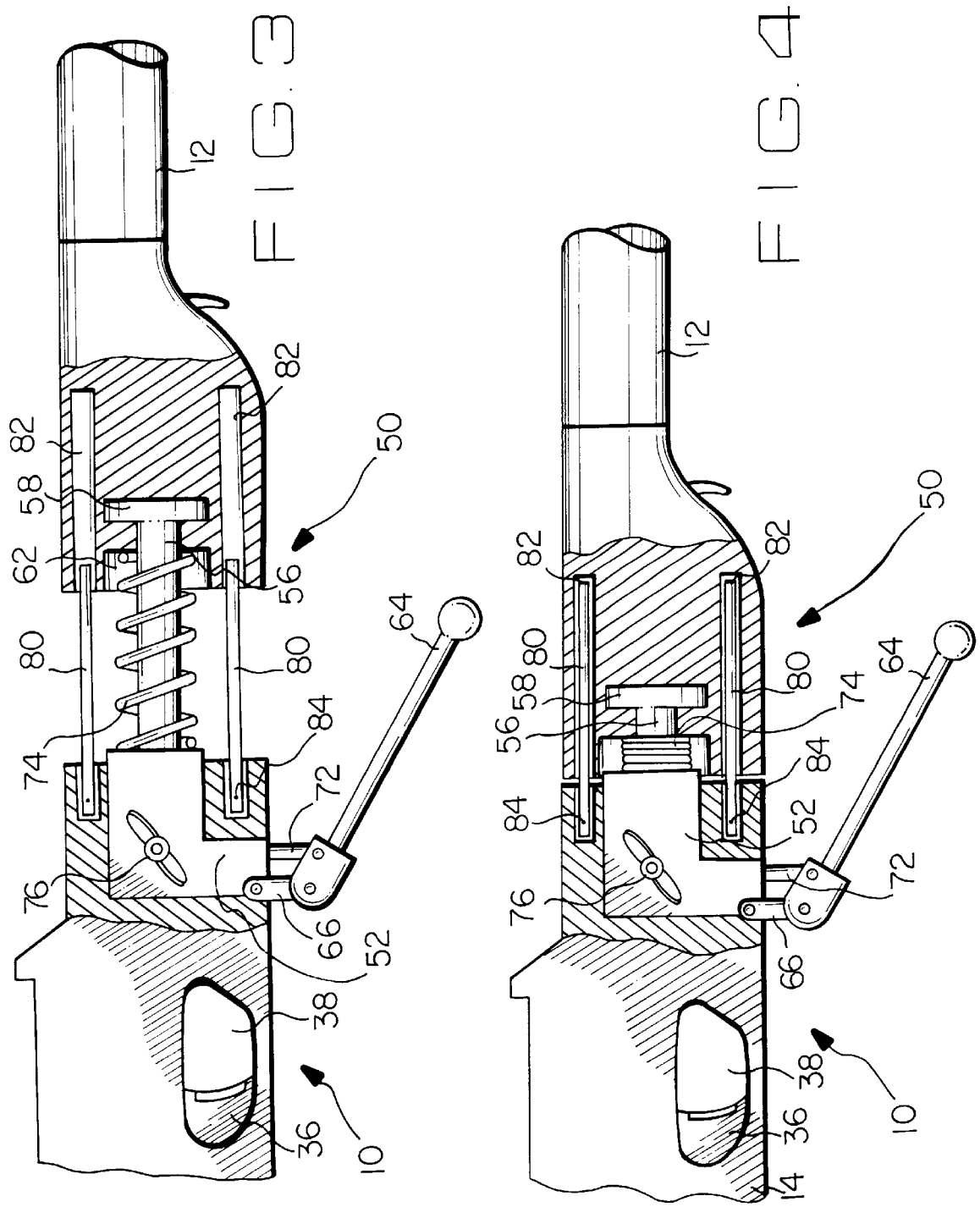

//USA Patent 5,931,145

SEPARATING STOCK HYDRAULIC SPEARGUN

BACKGROUND OF THE INVENTION

1. Field of the Invention

The present invention relates generally to the fields of diving and fishing equipment. More specifically the present invention relates to a speargun including a forward stock portion fitted with a conventional elongate gun body and a sling, and a separate rearward stock portion fitted with a handgrip and a spear engaging trigger mechanism. A spear retrieval line is secured around a line engaging catch protruding from the forward end of the forward stock portion. Operation of the trigger mechanism pivots the line engaging catch to release the line.

The two stock portions are interconnected by a hydraulic drive mechanism, similar in construction to a hydraulic jack. Stock portion guide rods longitudinally protrude from the rearward stock portion and slidably fit into longitudinal passageways within the forward stock portion. The hydraulic drive mechanism may alternatively be mounted to the exteriors of the stock portions.

To use the speargun, the rearward end of a conventional spear is placed in a trigger mechanism catch which engages a groove in the spear. Then fluid within the hydraulic drive mechanism is pumped to advance a hydraulic plunger and thereby progressively separate the forward and rearward stock portions. This separation increases tension in the sling. Once a desired sling tension level is reached, the user stops pumping the drive mechanism. The user applies pressure to a trigger mechanism lever and thereby mechanically releases the spear from the catch. The spear accelerates with the resilience of the sling and is launched as a projectile.

Prior known spearguns could be unloaded only by firing the spear, such as into a sandy area of the ocean floor. Having to return to the ocean floor to accomplish unload has often been a substantial but unavoidable inconvenience, because firing the spear above water could result in danger to bystanders and bending of the spear with high speed impact. A very important and inventive feature of the present speargun design is that it may be unloaded without firing the spear, simply by opening a hydraulic valve and gradually releasing fluid pressure and thus the tension in the slings. The stock portions advance toward each other until slings may be removed from the spear notches and the spear lifted away.

2. Description of the Prior Art

The spear is among the earliest and most fundamental weapons developed by man. "Although man has used spears to catch food underwater since ancient times, spearfishing did not become a popular sport until the 1930's, when face masks, which give swimmers better vision, were developed." *The Encyclopedia Americana International Edition*, Volume 25, page 461 (1996). Various power storage mechanisms have been developed to propel an elongate projectile such as a dart or spear from a gun. "[G]uns were designed that used gunpowder, carbon dioxide, or compressed air to propel the spear. . . . In the mid-1930's, Alec Kramarenko patented an underwater air gun in which the spear was propelled by a compressed spring. Shortly thereafter, there appeared a spring-propulsion-type gun invented by a Frenchman, Maxime Forlot, and the popular speargun designed by his compatriot Georges Beuchat and propelled by a rubber elastic band." *The New Encyclopedia Britannica*, Volume 11, page 75 (1995). "Rubber-powered spearguns are the most widely used devices for spearfishing. A steel spear from 2 to 6 feet (0.6 to 1.8 meters) long rests on top of the barrel of the gun. The spear is held in place by a catch connected to the trigger. The front end of the gun has one or more rubber loops attached to it. The hunter stretches the loops back and hooks them into notches in the spear." *The World Book Encyclopedia*, Volume 18, page 769 (1996). "These guns are easy to handle; they do not weigh very much and can be held in one hand for long periods of time so that the other hand is free for swimming. There are many versions of the rubber sling guns, all justly celebrated for their great penetration power at close range. . . . Sometimes, and especially when the rubber is new, it requires great strength to load these guns. The rubber pipe is stretched with both hands pulling the V-shaped joint towards the blunt end of the spear with the back of the gun against one's belly or knee." *Modern Spearfishing*, Vane Ivanovic, Henry Regnery Company, page 34 (1975). Thus, although the development of the modern speargun has led to the highly popular and effective rubber sling model, the use of this model is hampered by the struggle to pull the slings back by hand.

The problem of drawing elastic members to launch spears has been addressed most aggressively in the design of crossbows. To make cocking the bow faster and easier, and to increase the power and range of the crossbow, some hydraulic cocking mechanisms have been developed. These include Curcuzza, Sr., U.S. Pat. No. 3,561,419, issued on Feb. 9, 1971, which teaches a projectile launcher including an impeller within a barrel and an impeller retractor which draws the impelled back against elastic biasing, such as from a bow string, using fluid pressure. The impeller is connected to the impeller retractor by coupling means. Curcuzza, Sr. FIGS. 10–13 show the hydraulic cocking action. Problems with Curcuzza, Sr., are that the combined retracting and impelling mechanism is highly complex, and would be costly to produce and subject to mechanical failure. Another problem is that no means are taught for drawing speargun slings.

Choma, U.S. Pat. No. 5,220,906, issued on Jun. 22, 1993, discloses a crossbow after-market accessory for drawing the bow. Choma teaches an electric motor for rotating and advancing a threaded shaft to retract the bow string and bow. Choma states as an alternative, however, that "shaft 22 may be moved by hydraulic pressure or the like." See column 3, line 55. A problem with Choma is that there is no explanation of exactly how hydraulics might be implemented for this purpose. Another problem with Choma is that it must be secured to an existing crossbow when the bow is to be drawn. Still another problem is that Choma does not teach means for drawing speargun slings.

Two patents issued to Van House disclose archery bows with substantially rigid bow arms which use compressed gas as the spring means for accelerating a projectile. U.S. Pat. No. 4,041,927, issued on Aug. 16, 1977, recites "A gas spring 6 . . . made up of a piston 7 and cylinder 8" which can be adjusted to give different draw forces. See column 2, lines 41–45 and 59–66 generally. U.S. Pat. No. 4,169,456, issued on Oct. 2, 1979, states "As piston 50 moves rearwardly, air or other gas confined within the motor 48 is compressed. In full draw position . . . the air or other gas confined within the motor 48 represents stored energy urging the piston 50 forwardly . . ." See column 3, lines 43–65, generally. A problem with the Van House devices is that they do not teach a means for drawing conventional speargun elastic slings. Another problem is that the spear must be discharged to unload the gun. Therefore, if these compressed air drawing devices were used in a speargun, which these references in no way suggest, then it would have to be taken underwater and fired into soft sand. Firing above water could be a safety hazard and would likely damage the spear.

It is thus an object of the present invention to provide a hydraulic speargun which provides an exceptionally if not unsurpassed high power draw against high resistance elastic members such as slings for enhanced shooting range and accuracy.

It is another object of the present invention to provide such a speargun which permits rapid cocking to varying degrees of sling tension for selected levels of firing power, and with minimal physical exertion by the user.

It is another object of the present invention to provide such a speargun which separates the trigger mechanism from the drawing mechanism for greater simplicity, sturdiness and servicing convenience.

It is still another object of the present invention to provide such a speargun which can operate with one or with multiple spear propulsion slings, each sling having a higher tension than can be drawn by hand.

It is a further object of the present invention to provide such a speargun which retracts to a compact size for convenient storage and transport.

It is a still further object of the present invention to provide such a speargun which can be unloaded if desired without discharging the spear.

It is finally an object of the present invention to provide such a speargun which is reliable and relatively inexpensive to manufacture.

SUMMARY OF THE INVENTION

The present invention accomplishes the above-stated objectives, as well as others, as may be determined by a fair reading and interpretation of the entire specification.

A speargun apparatus is provided including a rearward stock portion including a spear engaging structure; a forward stock portion including a speargun body and elastic member mount and a spear propulsion elastic member; and an interconnection structure interconnecting the rearward stock portion and the forward stock portion including a hydraulic drive mechanism for driving apart the rearward stock portion and the forward stock portion to increase tension in the elastic member. The forward stock portion preferably includes a longitudinal passageway and the rearward stock portion preferably includes a forwardly protruding guide rod slidably fitting into the longitudinal passageway for strengthening and preventing relative rotation between forward stock portion and the rearward stock portions when they are driven apart. The rearward stock portion preferably includes the hydraulic drive mechanism base containing a fluid accumulation reservoir, a plunger slidably extensible from the base under pressure of hydraulic fluid within the reservoir, and a fluid pump for delivering fluid into the reservoir under pressure greater than atmospheric pressure. The rearward stock portion preferably contains a cavity and the base is retained within the cavity, and the plunger forward end is preferably secured to the forward stock portion.

The hydraulic drive mechanism preferably additionally includes a fluid holding chamber and a fluid release device for releasing the fluid from the reservoir into the holding chamber to permit movement of the forward stock portion and the rearward stock portion toward each other, after the forward stock portion and the rearward stock portion have been driven apart by the hydraulic drive mechanism. The speargun preferably additionally includes a return biasing structure for automatically moving the forward stock portion and the rearward stock portion toward each other upon activation of the release device.

A speargun apparatus is provided including a rearward stock portion including a spear engaging structure; a forward stock portion including a speargun body and elastic member mount and a spear propulsion elastic member; and an interconnection structure interconnecting the rearward stock portion and the forward stock portion including a drive mechanism for driving apart the rearward stock portion and the forward stock portion to increase tension in the elastic member. The drive mechanism preferably includes a release device for releasing the drive mechanism to permit movement of the forward stock portion and the rearward stock portion toward each other, after the forward stock portion and the rearward stock portion have been driven apart by the drive device. The speargun preferably additionally includes a return biasing structure for automatically moving the forward stock portion and the rearward stock portion toward each other upon activation of the release device. The forward stock portion preferably includes a longitudinal passageway and the rearward stock portion preferably includes a forwardly protruding guide rod slidably fitting into the longitudinal passageway for strengthening and preventing relative rotation between the forward stock portion and the rearward stock portion when they are driven apart.

A speargun apparatus is also provided including a rearward speargun body portion including a spear engaging structure; a forward speargun body portion including a speargun body segment fitted with elastic member mounting mechanism and a spear propulsion elastic member; and an interconnection structure interconnecting the rearward speargun body portion and the forward speargun body portion and including a drive mechanism for driving apart the rearward speargun body portion and the forward speargun body portion to increase tension in the elastic member.

A method of operating the above described speargun and a spear having an elastic member engaging notch including the steps of engagingly mounting the spear in the spear engaging mechanism; hooking the spear propulsion elastic member into the notch in the spear; pumping the drive mechanism to separate the forward and rearward stock portions and thereby stretch the spear propulsion sling; and releasing the spear from the spear engaging mechanism so that the elastic member drives the spear forwardly from the speargun.

BRIEF DESCRIPTION OF THE DRAWINGS

Various other objects, advantages, and features of the invention will become apparent to those skilled in the art from the following discussion taken in conjunction with the following drawings, in which:

FIG. 3 is a broken-away, partial cross-section of the stock portions in the drawn position, revealing the locations and the relationships between the various parts of the hydraulic drive mechanism, the guide rods and the passageways.

FIG. 4 is a view as in FIG. 3 with the stock portions in a retracted, mutually abutting non-firing position.

DETAILED DESCRIPTION OF THE PREFERRED EMBODIMENTS

Figure 1:
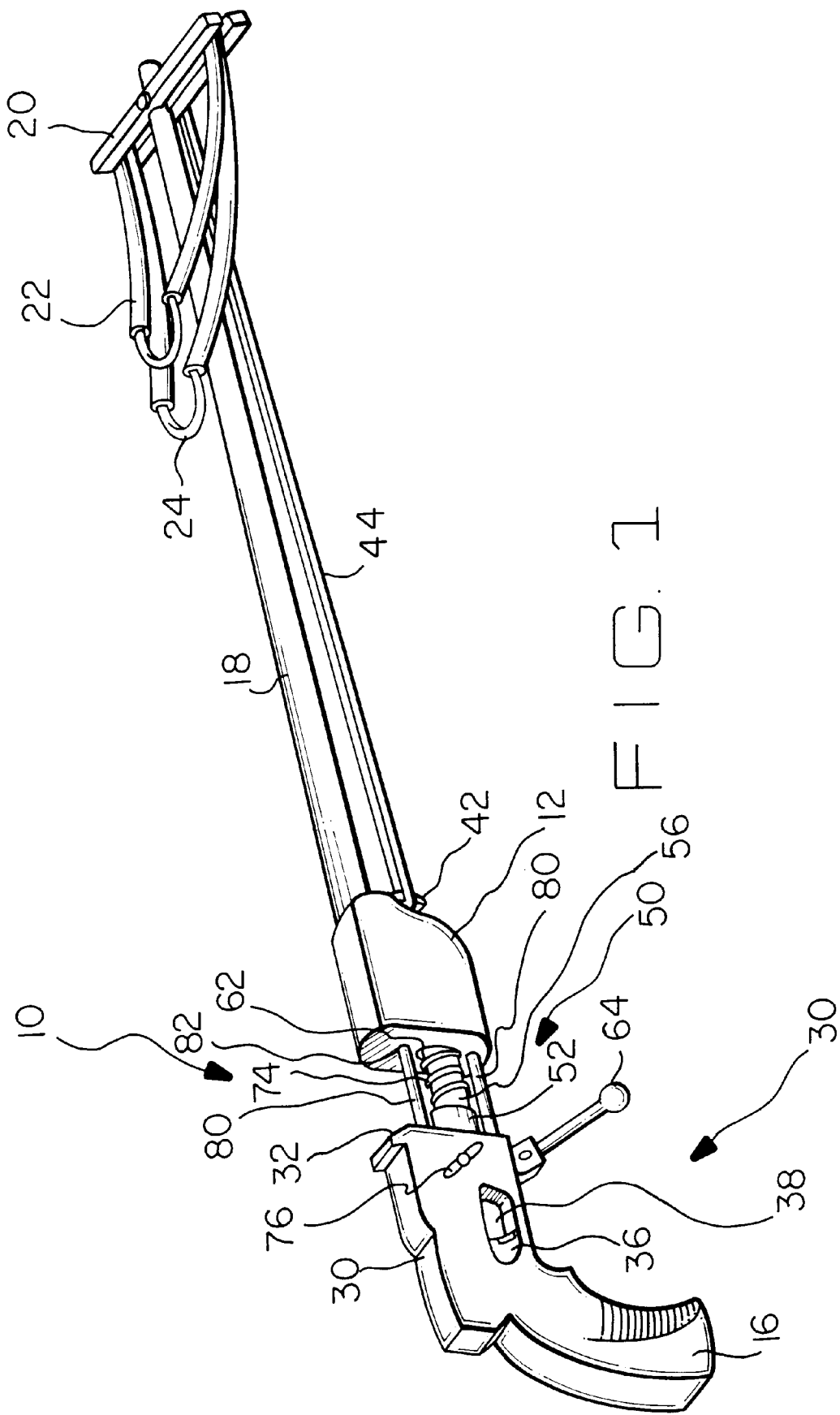
FIG. 1 is a perspective view of the inventive speargun, unloaded and in a drawn position.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Figure 2:
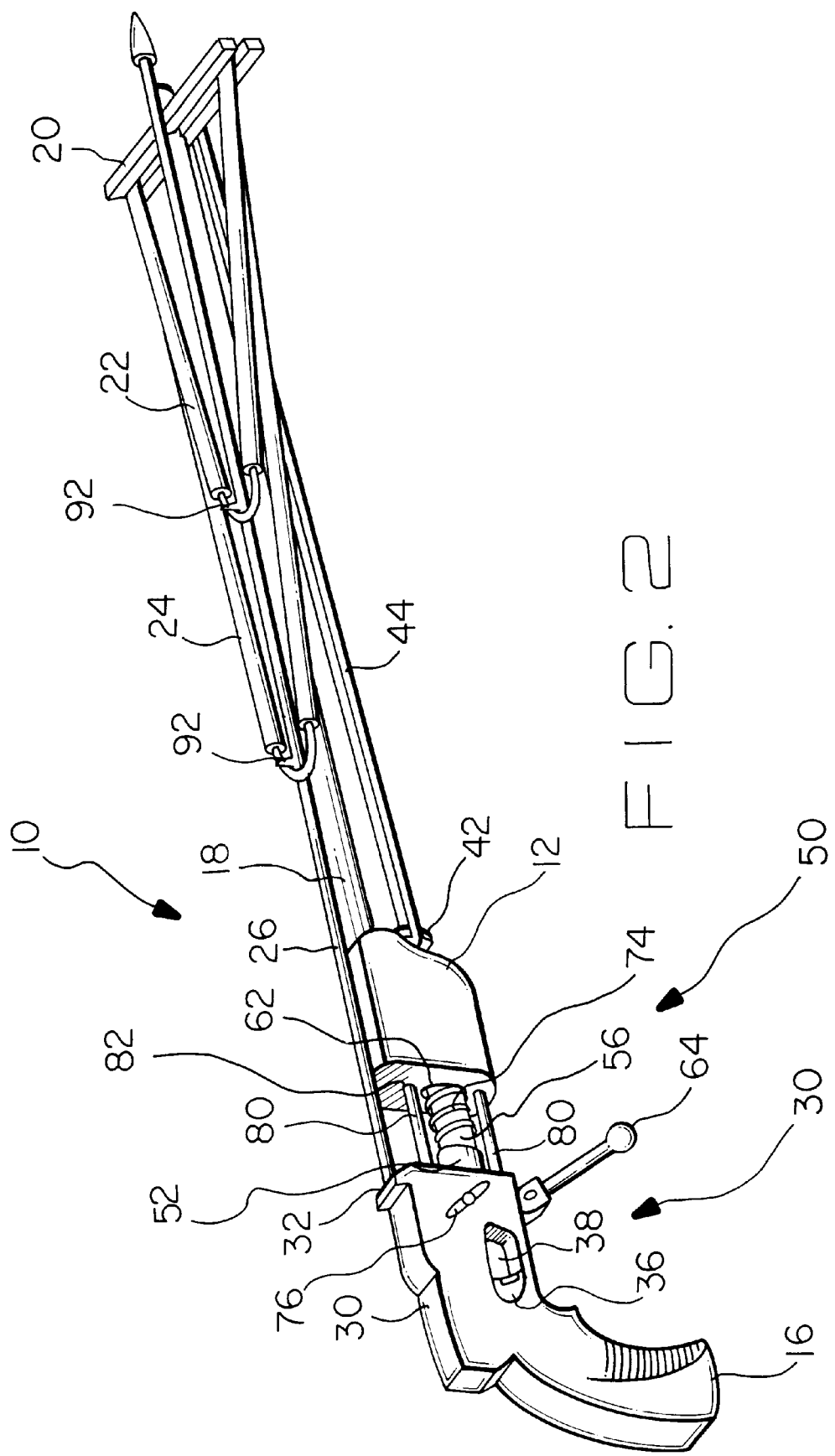
FIG. 2 is a perspective view of the inventive speargun loaded with a spear and in a drawn position, ready to fire.

Referring to FIGS. 1–4, a speargun 10 is disclosed including a forward stock portion 12 and a separate rearward stock portion 14. Forward and rearward stock portions 12 and 14, respectively, are separated with hydraulic means to increase the launching power of speargun 10.

Speargun 10 includes many conventional speargun parts, such as a handgrip 16, an elongate gun body 18, a sling mount 20 at the distal end of gun body 18, and two slings 22 and 24. It is noted that the use of hydraulic means rather than hand means for sling drawing permits the use of just one high power sling to permit rapid spear 26 loading. Elastic or resilient members other than slings are also contemplated.

The rearward stock portion 14 is fitted with a conventional trigger mechanism 30, having a spear engaging catch 32 opening forwardly from the upper surface of rearward stock portion 14. Trigger mechanism 30 extends downwardly through rearward stock portion 14 and a conventional trigger lever 36 within a trigger lever guard port 38. A pivotable spear line engaging catch 42 protrudes from the forward end of forward stock portion 12. A conventional spear retrieval line 44 is coiled around catch 42 and around a conventional line guide portion at the forward end of gun body 18, to retain line 44 until the user operates the trigger lever 36 and thereby releases line 44. Catch 42 is pivoted for line 44 release by a linkage (not shown) extending from trigger mechanism 30 and into forward stock portion 12, according to well known line catch construction principles.

Forward stock portion 12 and rearward stock portion 14 are interconnected by an extensible structure including a hydraulic drive mechanism 50 which drives stock portions 12 and 14 apart from each other. Drive mechanism 50 is essentially a hydraulic jack. A hydraulic reservoir base 52 is snugly retained within a base mounting cavity 54 inside rearward stock portion 14. The forward end of base 52 preferably protrudes forwardly out of rearward stock portion 14 and fits into a corresponding base recess 62 in forward stock portion 12 for added stock strength when the speargun 10 is retracted.

A drive plunger 56 slidably protrudes forwardly out of base 52 and includes an anchoring lip 58 extending radially outward from the plunger 56 forward end. Anchoring lip 58 is securely embedded in forward stock portion 12, to such a depth that forward and rearward stock portions 12 and 14, respectively, abut each other when drive plunger 56 is retracted into base 52. When plunger 56 is advanced out of base 52 a certain distance, stock portions 12 and 14 are therefore separated from each other by an equivalent distance.

Plunger 56 is advanced from hydraulic reservoir base 52 by operating a drive pump lever 64 pivotally extending from a linkage 66, which is in turn, pivotally connected to base 52, and bearing against a drive pump piston 72. Pivoting drive pump lever 64 axially reciprocates drive pump piston 72 to pump hydraulic fluid into a reservoir of conventional hydraulic jack design within base 52. Fluid entering the reservoir drives plunger 56 outwardly and forwardly, to separate stock portions 12 and 14. Plunger 56 may be retracted to permit forward and rearward stock portions 12 and 14 to move toward each other, and preferably to abut, each other, by opening a fluid valve with a valve handle 76 on the side of rearward stock portion 14. This fluid valve opens a port between the reservoir and a fluid holding chamber within base 52 through which the hydraulic fluid can escape from the reservoir into the chamber. A return spring 74 is preferably provided to bias forward and rearward stock portions 12 and 14 toward each other, so that opening the fluid valve causes stock portions 12 and 14 to retract together automatically.

Hydraulic drive mechanism 50 might equivalently be mechanically connected to an extensible stock portion interconnecting member. Some or all elements of hydraulic drive mechanism 50 might equivalently be connected to the exterior surfaces of the stock portions 12 and 14, whether to the top, bottom or side of stock portions 12 and 14. This broad meaning is intended in the claims hereto appended where it is stated that stock portions 12 and 14 include these elements.

As another embodiment, hydraulic drive mechanism 50 may divide speargun elongate body 18 rather the stock. Mechanical drive devices other than hydraulic mechanisms are contemplated. An example is a rack and ratchet structures similar to those used in automobile jacks. It is also noted that the drive mechanism 50 could be located virtually anywhere along the stock or elongate gun body 18 of speargun 10. Speargun 10 would simply separate at the given point and mounting means for mechanism 50 would be provided at that point.

Stock portion guide rods 80 preferably protrude forwardly from rearward stock portion 14, where they are anchored with spring pins 84, and slidably fit into guide passageways 82 bored longitudinally into forward stock portion 12. Passageways 82 are preferably lined with metal or plastic tubes (not shown) which each receive a guide rod 80, to better retain guide rod lubrication material. Guide rods 80 strengthen speargun 10 and prevent relative rotation between the forward stock portion 12 and the rearward stock portion 14 when these stock portions 12 and 14, respectively, are spaced apart from each other by drive mechanism 50. An accordion sleeve (not shown) optionally encloses and conceals the gap between the stock portions when they are separated.

Method

In practicing the invention, the following method may be used. To operate speargun 10, the spear 26 rearward end is hooked in spear engaging catch 32 which engages a groove (not shown) in the spear 26. Spear propulsion slings 22 and 24 are then partly stretched by hand and hooked into sling notches 92 along spear 26 shaft. The fluid valve is closed with valve handle 76, drive pump lever 64 is pivoted to drive the forward and rearward stock portions 12 and 14, respectively, apart from each other to increase tension in slings 22 and 24 and thereby draw slings 22 and 24 back into a desired firing position. Speargun 10 is aimed and trigger lever 36 is pulled in an ordinary way to release spear 26 from catch 32 and release the energy stored in resilient slings 22 and 24 to act upon and launch the spear 26 longitudinally out of speargun 10. The fluid valve is then opened to permit the stock portions to retract together.

A very important and inventive feature of the present speargun 10 design is that it may be unloaded without firing the spear 26, simply by opening a hydraulic valve with handle 76 and gradually releasing fluid pressure and thus the tension in slings 22 and 24. Stock portions 12 and 14 advance toward each other until slings 22 and 24 may be removed from the spear notches 92 and the spear 26 lifted away.

The degree of draw and thus the degree of firing power can be infinitely varied by selecting the extent of stock portion separation, which is accomplished by ceasing operation of lever 64 at the proper moment. A light draw could be appropriate where the speargun 10 is operated at a site other than a range, to prevent possible injury to other divers and to make fired projectiles easier to find and retrieve.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A speargun apparatus comprising:
    a speargun stock comprising a rearward stock portion including spear engaging means, and a forward stock portion including a speargun body fitted with elastic member mounting means and a spear propulsion elastic member;
    and interconnection means interconnecting said rearward stock portion and said forward stock portion including hydraulic drive means for driving apart said rearward stock portion and said forward stock portion to increase tension in the elastic members such that said speargun stock increases in length as said rearward stock portion and said forward stock portion separate.

2. The apparatus of claim 1, wherein said forward stock portion comprises a longitudinal passageway and wherein said rearward stock portion comprises a forwardly protruding guide rod slidably fitting into said longitudinal passageway for strengthening and preventing relative rotation between said forward stock portion and said rearward stock portion when said stock portions are driven apart from each other.

3. The apparatus of claim 1, wherein said rearward stock portion comprises a hydraulic drive means base containing a fluid accumulation reservoir, a plunger slidably extensible from said base under pressure of hydraulic fluid within said reservoir, and fluid pumping means for delivering fluid into said reservoir under pressure greater than atmospheric pressure.

4. The apparatus of claim 3, wherein said rearward stock portion contains a cavity and said base is retained within said cavity, and wherein said plunger has a plunger forward end and said plunger forward end is secured to said forward stock portion.

5. The apparatus of claim 3, wherein said hydraulic drive means additionally comprises a fluid holding chamber and fluid release means for releasing said fluid from said reservoir into said holding chamber to permit movement of said forward stock portion and said rearward stock portion toward each other, after said forward stock portion and said rearward stock portion have been driven apart by said hydraulic drive means, such that said speargun stock decreases in length as said rearward stock portion and said forward stock portion move toward each other.

6. The apparatus of claim 5, additionally comprising return biasing means for automatically moving said forward stock portion and said rearward stock portion toward each other upon activation of said release means.

7. A speargun apparatus comprising:
    a speargun stock comprising a rearward stock portion including spear engaging means, and a forward stock portion including a speargun body fitted with elastic member mounting means and a spear propulsion elastic member;
    and interconnection means interconnecting said rearward stock portion and said forward stock portion and including drive means for driving apart said rearward stock portion and said forward stock portion to increase tension in the elastic member, such that said speargun stock increases in length as said rearward stock portion and said forward stock portion are driven apart from each other.

8. The apparatus of claim 7, wherein said drive means comprises release means for releasing said drive means to permit movement of said forward stock portion and said rearward stock portion toward each other, after said forward stock portion and said rearward stock portion have been driven apart by said drive means.

9. The apparatus of claim 8, additionally comprising return biasing means for automatically moving said forward stock portion and said rearward stock portion toward each other upon activation of said release means.

10. The apparatus of claim 7, wherein said forward stock portion comprises a longitudinal passageway and wherein said rearward stock portion comprises a forwardly protruding guide rod slidably fitting into said longitudinal passageway for strengthening and preventing relative rotation between said forward stock portion and said rearward stock portion when said stock portions are driven apart from each other.

11. A speargun apparatus comprising:
    a speargun body comprising a rearward speargun body portion including spear engaging means, and a forward speargun body portion including a speargun body segment fitted with elastic member mounting means and a spear propulsion elastic member;
    and interconnection means interconnecting said rearward speargun body portion and said forward speargun body portion and including drive means for driving apart said rearward speargun body portion and said forward speargun body portion to increase tension in the elastic member, such that said speargun body increases in length as said rearward body portion and said forward body portion are driven apart from each other.

12. A method of operating a speargun comprising a speargun stock comprising a rearward stock portion including spear engaging means, and a forward stock portion including a speargun body fitted with elastic member mounting means and a spear propulsion elastic member; interconnection means interconnecting said rearward stock portion and said forward stock portion including hydraulic drive means for driving apart said rearward stock portion and said forward stock portion to increase tension in the elastic member; and a spear, having an elastic member engaging notch comprising the steps of:
    engagingly mounting said spear in said spear engaging means;
    hooking said spear propulsion elastic member into a notch in said spear;
    pumping said drive means to separate said forward and rearward stock portions such that said speargun stock increases in length and thereby stretches said spear propulsion sling;
    and releasing said spear from said spear engaging means such that said elastic member drives said spear forwardly from said speargun.

* * * * *